United States Patent [19]
Mowrer et al.

[11] Patent Number: 5,942,073
[45] Date of Patent: Aug. 24, 1999

[54] SILOXANE-MODIFIED ADHESIVE/ADHEREND SYSTEMS

[75] Inventors: Norman R. Mowrer, La Habra, Calif.; John F. Kane, Clearwater, Fla.; Colin G. Hull, Palos Verdes Estates, Calif.

[73] Assignee: Ameron International Corporation, Pasadena, Calif.

[21] Appl. No.: 08/851,149

[22] Filed: May 5, 1997

Related U.S. Application Data

[60] Provisional application No. 60/016,917, May 6, 1996.

[51] Int. Cl.$^6$ .................................................. C09J 163/00
[52] U.S. Cl. .......................... 156/329; 156/330; 428/447; 528/27; 528/21; 525/476; 523/435
[58] Field of Search .................................. 156/329, 330; 428/447; 528/27, 21; 525/476; 523/435

[56] References Cited

U.S. PATENT DOCUMENTS

| | | | |
|---|---|---|---|
| 4,332,844 | 6/1982 | Hamada et al. | 427/387 |
| 4,401,498 | 8/1983 | Jahn et al. | 156/307.1 |
| 4,401,500 | 8/1983 | Hamada et al. | 156/307.5 |
| 4,613,534 | 9/1986 | Blizzard et al. | 428/57 |
| 4,617,078 | 10/1986 | Takahashi et al. | 156/307.5 |
| 4,637,958 | 1/1987 | Wegehaupt et al. | 428/416 |
| 4,889,576 | 12/1989 | Suganuma et al. | 156/249 |
| 4,906,695 | 3/1990 | Blizzard et al. | 525/100 |
| 5,155,198 | 10/1992 | Keohan | 528/15 |
| 5,486,257 | 1/1996 | Onishi | 156/305 |
| 5,486,258 | 1/1996 | Onishi | 156/307.5 |
| 5,618,860 | 4/1997 | Mowrer et al. | 523/421 |
| 5,804,616 | 9/1998 | Mowrer et al. | 523/421 |

*Primary Examiner*—Margaret W. Glass
*Attorney, Agent, or Firm*—Christie, Parker & Hale, LLP

[57] ABSTRACT

Adhesive/adherend systems of this invention comprise a siloxane-modified adhesive component and a siloxane-modified adherend component. The siloxane-modified adhesive component is prepared by combining an epoxy resin with an organosilane ingredient, a polysiloxane resin, an amine hardener, an organometallic catalyst, a base catalyst, and any thickener and extender pigment. The siloxane-modified adherend component is prepared using a polysiloxane resin and may also contain other resins such epoxy, phenolic, polyester, vinyl ester, polyurethane, polyamide, melamine, furan, acrylate, thermoplastic polyvinyl chloride, polyethylene, polycarbonate, ABS, polystyrene, ethylene vinyl acetate, polyvinyl acetate, polyamide, and polypropylene resins. When placed into contact with one another, the siloxane groups in the siloxane-modified adhesive and siloxane-modified adherend components form Si—O—Si bonds between themselves to form an attachment force that both occurs at ambient temperature within a reasonable amount of time, and that is greater than otherwise possible using adhesive/adherend systems having unmodified adhesive and/or adherend components.

31 Claims, 1 Drawing Sheet

SILOXANE-MODIFIED ADHESIVE/ADHEREND SYSTEMS

RELATION TO COPENDING PATENT APPLICATIONS

This patent application is a continuation-in-part of U.S. Provisional Patent Application No. 60/016,917 filed on May 6, 1996.

FIELD OF THE INVENTION

This invention relates to adhesive/adherend systems and, more particularly to adhesive/adherend systems having siloxane modification formulated to provide increased bond strength when compared to adhesive/adherend systems that lack such siloxane modification.

BACKGROUND OF THE INVENTION

The use of organosilanes as adhesion promoters and as modifiers for adhesives to improve the bond strength of the adhesive to substrates is well known. For example, organosilanes are used to modify epoxy resin based adhesives to provide improved adhesion to steel, concrete, aluminum, etc. Organosilanes are also used to modify mineral-filled phenolic, urethane, polyester, furan and other thermosetting resins to improve adhesion between the mineral filler and resin matrix, thereby improving the overall strength of the composite. Likewise, the use of organosilanes to treat or size glass fibers and flakes to thereby provide improved adhesion to various organic resin binder systems in composites is also well known.

Certain adhesive/adherend system applications call for a high degree of bond strength that the above-described systems comprising either organosilane-modified adhesives or organosilane-modified adherends are not capable of providing. It is, therefore, desirable that an adhesive/adherend system be developed that is capable of providing an enhanced degree of bond strength when compared to adhesive/adherend systems that either lack organosilane modification altogether or that comprise a single organosilane-modified component, i.e., an organosilane-modified adhesive or an organosilane-modified adherend alone. It is desired that such an adhesive/adherend system be capable of curing at ambient temperature, develop bond strength very quickly, have a good degree of chemical resistance, and be suitable for continuous use at temperatures up to approximately 250° F.

SUMMARY OF THE INVENTION

Adhesive/adherend systems prepared according to principles of this invention comprise a siloxane-modified adhesive component, i.e., an adhesive resin composition having siloxane groups distributed therein, and a siloxane-modified adherend component, i.e., an adherend component also containing siloxane groups therein.

The siloxane-modified adhesive component is prepared by combining an epoxy resin with an organosilane ingredient, a polysiloxane resin, an amine-containing hardener, a base catalyst, and an organometallic catalyst. Optionally, a fumed silica ingredient, an extender pigment, filler and/or other flow control additives and the like may be added. The adhesive component is prepared and packaged as a two-pack system that is combined together prior to application. The ingredients used to prepare the adhesive component are present in desired proportions to provide a composition that is capable of curing at ambient temperature within a reasonable time.

The siloxane-modified adherend component is prepared using a polysiloxane resin to provide the siloxane groups needed to form Si—O—Si bonds with the adherend component. The adherend component may also contain other resins such epoxy, phenolic, polyester, vinyl ester, polyurethane, polyamide, melamine, furan, acrylate, thermoplastic polyvinyl chloride, polyethylene, polycarbonate, acrylonitrile-butadiene-styrene copolymer (ABS), polystyrene, ethylene vinyl acetate, polyvinyl acetate, polyamide, and polypropylene resins.

When placed into contact with one another, the siloxane groups in the siloxane-modified adhesive and siloxane-modified adherend components form Si-O-Si bonds between themselves to: (1) produce an attachment force that occurs at ambient temperature within a reasonable amount of time, and that is greater than otherwise possible using adhesive/adherend systems having unmodified adhesive and/or adherend components; (3) provide a bond that displays improved chemical resistance when compared to adhesive/adherend systems having unmodified adhesive and/or adherend components; and (4) provide a bond that is suitable for continuous use at temperatures up to approximately 250° F.

BRIEF DESCRIPTION OF THE DRAWINGS

These and other features of the present invention will become appreciated as the same become better understood with reference to the specification, claims and drawings wherein:

DETAILED DESCRIPTION

Adhesive/adherend systems, prepared according to principles of this invention, comprise a siloxane-modified epoxy adhesive, i.e., an epoxy adhesive having siloxane modification, that is used in combination with a siloxane-modified adherend to provide significantly improved bond strength when compared to adhesive/adherend systems that either contain no siloxane modification at all, or that contain siloxane modification in a single component, e.g., in either the adhesive component alone or the adherend component alone. Adhesive/adherend systems of this invention are formulated to cure at ambient temperature, develop bond strength very quickly, have good chemical resistance, and are suitable for continuous use at temperatures up to about 250° F.

Referring to the adhesive component of the system, siloxane-modified adhesives of this invention are prepared by combining: (1) an epoxy resin; with (2) a polysiloxane resin; (3) an organosilane ingredient; (4) an amine-containing hardener; (5) an organometallic catalyst; and (6) a base catalyst. Optionally, a thickener or thixotropic agent, an extender pigment, filler, and other flow control agents can be used if desired.

Referring to the epoxy resin ingredient, suitable epoxy resins useful for forming the adhesive component include those having more than one epoxide group per molecule. It is also desired that the epoxy resin have a weight average molecular weight in the range of from about 300 to 2,000. In a preferred embodiment, in the range of from about 15 to 40 percent by weight of the epoxy ingredient is used to prepare the adhesive component based on the total weight of the adhesive composition. Using less than about 15 percent by weight of the epoxy resin ingredient may produce a finally-cured product that is lacks a desired degree of mechanical strength and chemical bond strength, and that may have a lower degree of chemical resistance to alkaline substances than that desired for particular applications. Using greater than about 40 percent by weight of the epoxy resin ingredient may produce a finally-cured product that may be too brittle, have a low degree of chemical resistance to acidic reagents, or have a poor degree of chemical bond strength than that desired for particular applications. In a particularly preferred embodiment, approximately 33 percent by weight of the epoxy resin is used to prepare the adhesive component.

Any epoxy resin containing more than one epoxide group per molecule may be used including saturated and unsaturated aliphatic, cycloaliphatic, and aromatic epoxy resins. Aromatic types of epoxy resins such as bisphenol A, bisphenol F and novolac epoxy resins are preferred for optimum bond strength at ambient and elevated temperature. Examples of commercially available epoxy resins found useful for forming the adhesive component of this invention include Epon 834, Epon 828, Epon 862, Epon 1001, Eponex 1510 and Heloxy 107 that are commercially available from Shell Chemical of Houston, Tex.; Dow Chemical's DER 331, DEN 432, DEN 438 and DER 732; and CVC Specialty Chemical's Epalloy 8250, RF50 and Epalloy 8230 are also representative of the many epoxy resins that may be used in practice.

Referring to the polysiloxane resin ingredient, suitable polysiloxane resins include silanol-or alkoxy-functional polysiloxane resins having a weight average molecular weight in the range of from about 200 to 10,000. The use of the polysiloxane resin ingredient is desired because it has been shown to improve chemical bond strength, flexibility, acid and heat resistance of the finally-cured product. In a preferred embodiment, the adhesive component is prepared by using in the range of from about 0.5 to 20 percent by weight of the polysiloxane resin based on the total weight of the adhesive composition. Using less than about 0.5 percent by weight of the polysiloxane resin ingredient having a lessor degree of siloxane modification than desired to provide improvements in flexibility, chemical bond strength, acid and heat resistance. Using greater than about 20 percent by weight of the polysiloxane resin ingredient may produce a finally-cured product having a lower degree of mechanical strength and alkali resistance that desired for particular applications. In a particularly preferred embodiment, approximately one percent by weight of the polysiloxane resin ingredient is used to prepare the adhesive component.

Silanol- or alkoxy-functional polysiloxane resins found most useful in this invention include those having the following general formula:

where each $R_2$ can be the same or different and is independently selected from the group consisting of the hydroxy group and alkyl, aryl, alkenyl, and alkoxy groups having up to about six carbon atoms, where each $R_1$ can be the same or different and is independently selected from the group consisting of hydrogen, alkyl, alkenyl, and aryl groups having up to about 12 carbon atoms, and where "n" is selected so that the polysiloxane resin ingredient has a weight average molecular weight in the range of from about 200 to 10,000.

Examples of commercially available silanol- or alkoxy-functional polysiloxanes include DC-3037, DC-3074, Z6018, DC-1-2530, GP-8-5314 and DC-1-0543 available from Dow Corning of Midland, Mich.; and SY201, SY231, SY550, SY430 and SY409 available from Wacker Silicones of Adrian, Mich.

Referring to the organosilane ingredient, suitable organosilanes useful for forming the adhesive component of this invention include those having a weight average molecular weight in the range of from about 90 to 500. The use of the organosilane ingredient is desired because it provides improved properties of adhesion to a variety of substrates. In a preferred embodiment, the adhesive component is prepared by using in the range of from about 0.25 to 20 percent by weight of the organosilane ingredient based on the total weight of the adhesive composition. Using less than about 0.25 percent by weight of the organosilane ingredient may produce a adhesive component having a lower degree of adhesion than desired for particular applications. Using greater than about 20 percent by weight of the organosilane ingredient may produce a finally-cured product that is more brittle than desired for particular applications. In a particularly preferred embodiment, approximately two percent by weight of the organosilane ingredient is used to prepare the adhesive component.

Organosilanes found useful in the practice of this invention include but are not limited to epoxy silanes, aminosilanes, mercaptosilanes, vinyl silanes, acryl and methacrylic silanes, including those having the following general formula:

where "Y" is an organo-functional group selected from where $R_3$ is selected from the group consisting of alkyl, alkenyl, cycloalkyl, alkylaryl, aryl, aminoalkyl, aminoaryl, and aminocycloalkyl groups having up to about ten carbon atoms, and where each $R_4$ group can be the same or different and is independently selected from the group consisting of alkyl, cycloalkyl, aryl, alkoxy and acetoxy groups.

Examples of suitable organosilane ingredients useful for forming adhesive components of this invention include those that are commercially available, for example, from OSi Specialty Chemicals of Danbury, Connecticut under the Silquest line of silanes that include vinyl silanes, methacryloxy silanes, epoxy silanes, sulfur silanes, and amino silanes under the A-1100 series. Particularly preferred organosilanes are the A-1100 amino silanes, such as A-1130 (triamino-functional silane).

Referring to the amine-containing hardener, suitable amine-containing hardeners useful for forming the adhesive component of this invention include those selected from the group comprising aliphatic, cycloaliphatic or aromatic polyamines, polyamide or amidoamine hardeners having at least two active amine hydrogens per molecule. It is desired that the amine-containing hardener have a weight average molecular weight in the range of from about 60 to 600. The use of the amine-containing hardener ingredient is desired because it helps to control the cross-linking of the epoxy resin ingredient.

In a preferred embodiment, the adhesive component is prepared by using in the range of from about 1 to 25 percent by weight of the amine-containing hardener ingredient based on the total weight of the adhesive composition. Using less than about one percent by weight of the amine-containing hardener ingredient can produce an adhesive composition having an insufficient degree of amine functionality to cross link or cure the epoxy resin ingredient. Using greater than about 25 percent by weight of the amine-containing hardener ingredient it may produce an adhesive composition having excess or unreacted amine, which can reduce the overall chemical bond strength and chemical resistance of the finally-cured product. In a particularly preferred embodiment, approximately 16 percent by weight of the amine-containing hardener ingredient is used to prepare the adhesive component.

Suitable amine-containing hardener ingredients include those selected from the group consisting of aliphatic, cycloaliphatic or aromatic polyamines, amidoamine or polyamide hardeners, and combinations thereof that meet the above-described requirements. The particular type of amine-containing hardener ingredient that is selected may depend on the final adhesive/adherend system applications. For example, the use of aliphatic polyamines are desired where rapid attainment of bond strength is needed, the use of cycloaliphatic polyamines are desired when long pot life is required, the use of aromatic polyamines are desired in those applications where a high degree of chemical resistance is needed, and the use of amidoamine or polyamide hardeners are desired in those applications where some flexibility of the adhesive or adhesive/adherend joint is required.

To promote cross-linking of the epoxy resin ingredient, it is required that the amine hardener contain at least two active amine hydrogens per molecule. Preferred amine-containing hardeners include those that are commercially available from, for example, Air Products and Chemicals of Allentown, Pa. under the product line Ancamine, and more particularly Ancamine DETA (diethylentriamine) and Ancamine 2422.

Referring to the organometallic catalyst, suitable materials include metal driers well known in the paint industry, e.g., zinc, manganese, cobalt, iron, lead and tin octoate, neodecanates and napthenates. Organotitanates such as butyl titanate and the like are also useful in the current invention. Use of the organometallic catalyst is desired to catalyze hydrolysis and condensation of the organosilane and polysiloxane resin and, thereby help promote ambient temperature curing within a reasonable time. In a preferred embodiment, the adhesive component is prepared by using in the range of from about 0.1 to 5 percent by weight of the organometallic catalyst based on the total weight of the adhesive composition. Using less than about 0.1 percent by weight of the organometallic catalyst can produce an adhesive composition having a long cure time that may not be suitable for particular applications. Using greater than about five percent by weight of the organometallic catalyst can produce a finally-cured product having lowered properties of mechanical strength, chemical bond strength and chemical resistance due to its presence in excess. In a particularly preferred embodiment, approximately 0.4 percent by weight of the organometallic catalyst is used to prepare the adhesive component.

A particularly preferred class of organometallic catalysts are organotin compounds which have the following general formula:

where the $R_5$, $R_6$, $R_7$ and $R_8$ groups are selected from the group consisting of alkyl, aryl and alkoxy groups having up to about 15 carbon atoms, and where any two of the $R_5$, $R_6$, $R_7$ and $R_8$ groups are also selected from the group consisting of inorganic atoms consisting of halogen, sulphur or oxygen.

Organotin compounds useful as catalysts include tetramethyltin, tetrabutyltin, tetraoctyltin, tributyltin chloride, tributyltin methacrylate, dibutyltin dichloride, dibutyltin oxide, dibutyltin sulfide, dibutyltin acetate, dibutyltin dialaurate, dibutyltin maleate polymer, dibutyltin dilaurylmercapitde, tin octoate, dibutyltin bis-(isooctylthioglycolate), dioctyltin oxide, dioctyltin dilaurate, dioctyltin oxide, diostyltin dilaurate, dioctyltin maleate polymer, dioctyltin bis-(isooctylthioglycolate) dioctyltin sulfide and dibutyltin 3-(mercapto propinate). A particularly preferred organometallic catalyst is dibutyltindiacetate that is commercially available from, for example, Air Products & Chemicals under the product name Metacure T-1.

Referring to the base catalyst, the base catalyst is used in combination with the organometallic catalyst to catalyze both the epoxy-polyamine hardener reaction and the hydrolysis and condensation reactions of the organosilane ingredient and polysiloxane resins. The base catalyst and organometallic catalyst react synergistically to promote the cure process and, thereby promote ambient temperature cure within a reasonable time.

Suitable base catalysts for this invention include those selected from the group consisting of mercaptans, polyamides, polyimides, amidoamides, and aliphatic amine compounds and aromatic amine compounds having the general formula:

where each $R_9$ and $R_{10}$ group is independently selected from hydrogen, aryl and alkyl groups having up to about 12 carbon atoms, and where $R_{11}$ is selected from the group consisting of alkyl, aryl and hydroxy alkyl groups having up to about 12 carbon atoms. In a preferred embodiment, the adhesive component is prepared by using in the range of from about 0.1 to 10 percent by weight of the base catalyst based on the total weight of the adhesive composition. Using less than about 0.1 percent by weight of the base catalyst may not produce an adhesive composition having a sufficient rate of cure at ambient temperature to facilitate its use in particular applications. Using greater than about ten percent by weight of the base catalyst may produce an adhesive composition having an excess amount of base catalyst that may reduce chemical bond strength, mechanical strength, and chemical resistance in a finally-cured product. In a particularly preferred embodiment, approximately five percent by weight of the base catalyst is used to prepare the adhesive component.

Amines found useful as base catalysts include dimethyl methanolamine, dimethyl ethanolamine, dimethyl propanolamine, dimethyl butanolamine, dimethyl pentanolamine, dimethyl hexanolamine, methylethyl methoanalamine, methyl propyl methanolamine, methyl ethyl ethanolamine, methyl ethyl propanolamine, mono isopropanolamine, methyl diethanolamine, triethanolmaine, diethanolamine, ethanolamine. A particularly preferred base catalyst is 2,4,6-tris(dimethylaminomethyl) phenol, which is commercially available from Air Products & Chemicals under the product name Ancamine K54.

Referring to the thickener or thixoptopic agent, the use of a thickener is optional and may be desired to achieve a particular adhesive viscosity for mixing and application. Additionally, the use of a thickener may be desired because it acts to reinforce the resinous binder to provide increased adhesive strength. A preferred thickener is fumed silica that is commercially available, for example, from Cabot Corp., of Waltham, Mass. under the Cab-O-Sil product line. A particularly preferred fumed silica ingredient is Cab-O-Sil TS-720.

In a preferred embodiment, the adhesive component is prepared by using up to about five percent by weight of the fumed silica ingredient based on the total weight of the adhesive composition. Using greater than about five percent by weight of the fumed silica ingredient may produce an adhesive composition that it too thick or viscous to mix or apply. In a particularly preferred embodiment, approximately 0.6 percent by weight of the fumed silica ingredient is used to prepare the adhesive component.

Use of an extender pigment ingredient is optional and may be desired to reduce cost, increase modulus, reduce sensitivity to thermal shock, and to modify the adhesive formula to provide convenient mix ratios. In a preferred embodiment, the adhesive component is prepared by using up to about 60 percent by weight of the extender pigment ingredient based on the total weight of the adhesive composition. Using greater than about 60 percent by weight of the extender pigment ingredient can produce an adhesive composition having an insufficient amount of resin to provide a desired degree of adhesion in certain applications. In a particularly preferred embodiment, approximately 40 percent by weight of the extender pigment ingredient is used to prepare the adhesive component.

Suitable extender pigment ingredients include silica, mica, wollastonite, talc, calcium carbonate, and other conventional pigment ingredients. A particularly preferred extender pigment for forming the adhesive component of this invention is wollastonite that is commercially available from, for example, Nyco, Inc., of Willsboro, N.Y. under the product name Nyad 1250. Siloxane-modified adhesives prepared according to principles of this invention may also contain small amounts of other agents such as pigment wetting agents, surfactants, organic or inorganic color pigments, hydrocarbon resin extenders, tackifiers and the like. Such other additives may be present up to about 10 percent by weight of the total adhesive component composition.

Siloxane-modified adhesives prepared according to principles of this invention are preferably prepared as a two-part or two-pack system, wherein a first part comprises the epoxy resin, polysiloxane resin, organometallic catalyst, any thickener, and any extender pigment, and a second part comprises the amine hardener, organosilane, and base catalyst ingredients. Prior to its application, the first and second parts are combined and mixed together, causing the organosilane and polysiloxane resin ingredients to undergo hydrolysis and condensation reactions (in the presence of the organometallic and base catalysts), and causing the epoxy resin to undergo cross-linking reactions with the amine hardener ingredient, thereby forming a cured epoxy resin having siloxane modification. The isolated reaction between the epoxy resin and amine hardener ingredient is similar to that disclosed in U.S. Pat. No. 5,618,860, which is herein incorporated by reference.

The adhesive composition is formulated, when the first and second parts are combined together, to cure at ambient temperatures in the range of from about $-10°$ C. to $120°$ C. within a time period of from about 16 hours to ten minutes, respectively. It is to be understood that the amount of time that it takes the adhesive components of this invention to achieve 100 percent cure depends on many factors such as the ambient temperature, the amount of organometallic and base catalysts that are used, and the relative humidity.

With respect to the adherend component of the adhesive/adherend system of this invention, preferred adherends are substrates having siloxane-modification. Adherend components used or prepared in the practice of this invention can comprise any one, two or other multiple component, unfilled or reinforced, thermoplastic or thermosetting polymer that have siloxane modification, i.e., that are capable of forming an Si—O—Si bond with the siloxane-modified adhesive component. Adherend components used or prepared in the practice of this invention may be formed from exclusively from such siloxane-modified resins in their cured form, or may be in the form of a composite comprising on or more such resins in combination with one or more other element, e.g., a structurally reinforcing element such as fiberglass or the like.

Preferred adherends include those that are prepared by using silanol- or alkoxy-functional polysiloxane resins. Particularly preferred siloxane-modified adherend components are prepared by using in the range of from about 0.5 to 25 percent by weight of an alkoxy-or silanol-functional polysiloxane resin. It is further desired that the polysiloxane resin have a weight average molecular weight in the range of from about 200 to about 10,000. The polysiloxane resin ingredients that are most useful in forming the adherend component of this invention include those previously described for forming the adhesive component of the invention. Additionally, if desired, the adherend may be prepared by also using an organometallic catalyst and a base catalyst to promote hydrolysis and condensation of the polysiloxane. Suitable organometallic catalysts and base catalysts include those previously described for forming the adhesive component of the invention.

The adherend component of this invention may also include other resins, such as epoxy, phenolic, polyester and vinyl ester, polyurethane, polyamide, melamine, furan, acrylate and thermoplastic polyvinyl chloride, polyethylene, polycarbonate, ABS, polystyrene, ethylene vinyl acetate and polyvinyl acetate, polyamide, and polypropylene resins depending on the final intended use for the adherend. For example, is desirable to prepare an adherend using a phenolic resin in addition to the polysiloxane resin for applications that call for an adherent having good temperature or flame resistance.

Figure 1:
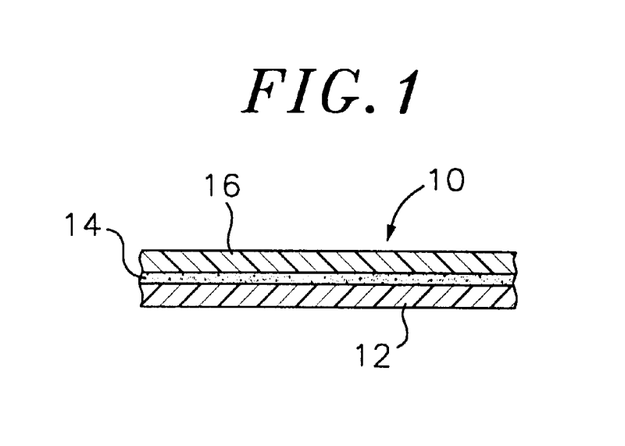
FIG. 1 is a cross-sectional side elevation of a first example siloxane adhesive/adherend system according to principles of the invention.

Siloxane-modified adhesive/adherend systems of this invention are useful to form a strong bond between two siloxane-modified substrates or adherends. Referring to FIG. 1, an example siloxane-modified adhesive/adherend system 10 used in this manner generally comprise a first siloxane-modified adherend or substrate 12, a siloxane-modified adhesive 14 disposed on a surface portion of the first siloxane-modified adherend 12, and a second siloxane-modified adherend or substrate 16 disposed onto the siloxane-modified adhesive 14. The finally-cured siloxane-modified adhesive 12 forms a strong bond to each of the adjacent first and second siloxane-modified adherends 14 and 16, thereby strongly bonding the two adherends together. Depending on the particular application, the second siloxane-modified adherend 16 can be formed from a material that is the same as or different from that used to form the first siloxane-modified adherend 12, however, each having siloxane modification.

Figure 2:
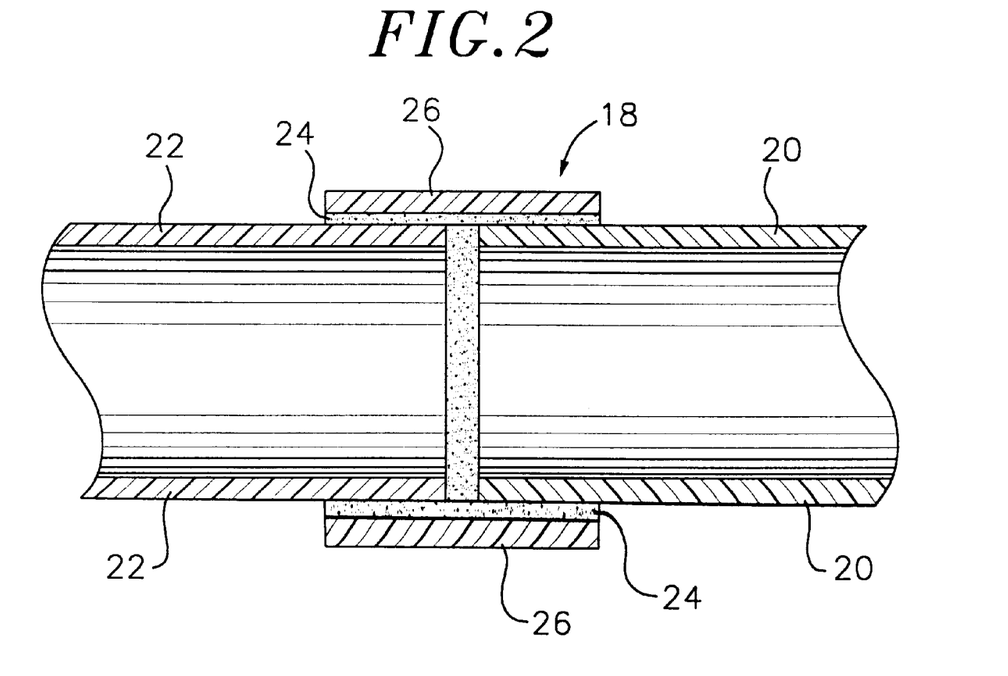
FIG. 2 is a cross-sectional side elevation of a second example siloxane adhesive/adherend system according to principles of the invention.

It is to be understood that the adherend component of the invention can be in the form of a number of different structures, depending on its intended purpose and function. For example, for fluid or gas transport applications, the adherend may take on the form of a pipe, pipe fitting and the like. More specifically, the adherend can be in the form of a fiberglass reinforced resin pipe and pipe fitting or coupling, each comprising a siloxane-modified resin component, e.g., siloxane-modified epoxy resin, siloxane-modified phenolic resin and the like. Referring to FIG. 2, an example siloxane-modified adhesive/adherend system 18 adapted to join two pipe lengths together comprise a first pipe member 20 (first siloxane-modified adherend) and a second pipe member 22 (first siloxane-modified adherend) positioned coaxially with their pipe ends adjacent and/or in contact with one another. A siloxane-modified adhesive 24 is disposed over a surface portion of each pipe near the pipe ends, and a pipe fitting 26 having siloxane modification (second siloxane-modified adherend) is positioned over the pipe ends and onto the siloxane-modified adhesive 24. Once cured, the siloxane-modified adhesive 24 forms a strong bond to both the pipes 20 and 22 and the fitting 26, thereby strongly bonding the pipes and fitting together.

The thickness of siloxane-modified adhesive needed to obtain a bond between siloxane-modified adherends depends on the particular application, and may be in the range of from 0.02 millimeters to 10 millimeters.

Although specific embodiments of siloxane-modified adhesive/adherend systems have been described and illustrated above, it is to be understood that siloxane-modified adhesive/adherend systems of this invention may be practiced other than that specifically described and still be within the intended scope of the invention. For example, rather than being useful for joining pipes together, siloxane-modified adhesive/adherend systems of this invention may be used to join pipe fillings, such as tees, elbows and the like to pipe ends. Additionally, rather than being useful for joining fluid-handling devices together, siloxane-modified adhesive/adherend systems of this invention can be used to join together siloxane-modified adherends that do not have a fluid-handling function, e.g., planar or flat surfaces of siloxane-modified construction members, siloxane-modified components of composite constructions, or the like.

The mechanisms by which the siloxane-modified adhesive/adherend system provides superior adhesive characteristics is not completely understood but is believed to be related to the excellent wetting characteristics of the siloxane-modified adhesive, low shrinkage during cure, high inherent cohesive strength of the adhesive, and formation of siloxane bonds between the adhesive and adherend.

These and other features of the invention will be better understood with reference to the following examples. It is to be understood that the following examples are illustrative of but a few embodiments of siloxane-modified adhesive/adherend systems of this invention, and are not intended to be limiting of all the different embodiments of adhesive/adherend systems that can be prepared according to principles of this invention. The examples set forth a siloxane-modified epoxy adhesive, a siloxane-modified phenolic adherend, and an unmodified phenolic and epoxy adherend.

EXAMPLE NO. 1

Siloxane-Modified Epoxy Resin Adhesive

A siloxane-modified epoxy resin adhesive component was prepared by combining the following ingredients in the following proportions. A first part, Part A, was prepared by combining approximately 33 percent by weight (pbw) epoxy resin (Epalloy 8250-epoxy novolac); 15 pbw extender pigment (Nyad 1250); 0.6 pbw fumed silica ingredient (Cab-O-Sil TS-720); 0.6 pbw organometallic catalyst (Metacure T-1-dibutyltindiacetate); 0.4 pbw polysiloxane resin (SY231); and 0.9 pbw optional agents, pigments and the like. A second part, Part B, was prepared by combining approximately 15 pbw amine hardener ingredient (Ancamine DETA); 25 pbw extender pigment (Nyad 1250); 2.5 pbw organosilane (A-1 130-aminosilane); 5 pbw base catalysts (Ancamine K54); and 1 pbw optional agents.

EXAMPLE NO. 2

Unmodified-Epoxy Resin Adhesive

An unmodified epoxy resin adhesive component was prepared to compare against the siloxane-modified epoxy resin adhesive of Example No. 1 by combining the following ingredients in the following proportions: A first part, Part A, was prepared by combining approximately 27 pbw of a first epoxy resin (DEN 438-epoxy novolac); 20 pbw of a second epoxy resin (Epon 826-bisphenol A epoxy resin); 2.5 pbw fumed silica ingredient (Cab-O-Sil TS-720); and 2.5 pbw extender filler (220 Grit Aluminum Oxide). A second part, Part B, was prepared by combining approximately 27 pbw amine hardener ingredient (Ancamine PACM-cycloaliphatic amine); and 23 pbw base catalyst (Ancamine 1637-polyamine).

EXAMPLE NO. 3

Siloxane-Modified Phenolic Adherend

A siloxane-modified phenolic resin for use in constructing an adherend component was prepared according to principles of this invention by combining the following ingredients in the following proportions: approximately 80 pbw phenolic resin (J2027L phenolic resole resin available from BP Chemicals of Sully, England); 6 pbw acid catalyst (Phencat 381 also available from BP Chemicals); 12 pbw polysiloxane resin (SY321); 0.3 pbw organometallic catalyst (Metacure T-1); and 0.3 pbw base catalyst (ethylaminoethanol). A 15-ply fiberglass reinforced laminate was prepared from Owens Corning 24 oz. Woven roving and the siloxane-modified phenolic resin by preimpregnating the 15 layers of glass roving with the liquid resin, placing the preimpregnated layers of glass rovings between release coated steel plates, and curing the layers for one hour at 175° F. plus one hour at 250° F. The glass content of the finally prepared adherend was about 75 percent by weight.

EXAMPLE NO. 4

Siloxane-modified epoxy adherend

A siloxane-modified epoxy resin for use in constructing an adherend component was prepared according to principles of this invention by combining the following ingredients in the following proportions: approximately 77 pbw epoxy resin (Epon 826-bisphenol A epoxy resin); 18 pbw amine hardener ingredient (isophorone diamine); 5 pbw polysiloxane resin (SY23 1); 0.2 pbw organometallic catalyst (Metacure T-1); and 0.2 pbw base catalyst (ethylaminoethanol). A fiberglass reinforced laminate was prepared in the same manner as that described above for Example No. 3, and the glass content of the finally prepared adherend was about 75 percent by weight.

EXAMPLE NO. 5

Unmodified Phenolic Adherend

An unmodified phenolic resin for use in forming an adherend was prepared for purposes of comparison against the adherend of Example No. 1 using the same formula as that set forth in Example No. 3, but without the polysiloxane resin, organometallic catalyst, and base catalyst.

EXAMPLE NO. 6

Unmodified Epoxy Adherend

An unmodified epoxy resin for use in forming an adherend was prepared for purposes of comparison against the adherend of Example No. 4 using the same formula as that set forth in Example No. 4, but without the polysiloxane resin, organometallic catalyst, and base catalyst.

Preparation of Test Specimens

Single bond lap shear test specimens were prepared from each adhesive and adherend prepared in Example Nos. 1 to 6 using a SATEC universal testing machine to apply load at a rate of approximately 30 mils/min to determine bond strength. More specifically, the test specimens were prepared by placing a thickness of the to-be tested adhesive onto a surface of a to-be tested first substrate, and placing a surface of a to-be tested second adherend (that is the same as the first adherend) into contact with the exposed surface of the to-be tested adhesive so that the to-be tested adhesive is sandwiched between both adherends. The adhesive was allowed to cure to form a bond between the first and second adherends. A portion of the first adherend was securly anchored in a vertical position while a load was applied to free end of the downwardly directed second adherend.

Test Results

Results from the single bond lap shear strength test are set forth in Table 1. For the test, each of the different adhesive examples were combined with each of the different adherend examples to illustrate the enhanced shear strength effect that occurs when each of the adhesive and adherend component are siloxane modified, when compared to adhesive/adherend systems where either the adhesive or adherend is lacking siloxane modification.

TABLE 1

SINGLE BOND LAP SHEAR STRENGTH

| ADHEREND | ADHESIVE | BOND THICK- NESS/ INCH | LAP SHEAR STRENGTH, psi INDIVID- UAL | AVER- AGE | FAILURE MODE |
|---|---|---|---|---|---|
| Example No. 3 w/siloxane | Example No. 1 w/siloxane | 0.005 0.020 0.010 | 944 1067 1126 | 1040 | cohesive cohesive cohesive |

TABLE 1-continued

SINGLE BOND LAP SHEAR STRENGTH

| ADHEREND | ADHESIVE | BOND THICK- NESS/ INCH | LAP SHEAR STRENGTH, psi INDIVID- UAL | AVER- AGE | FAILURE MODE |
|---|---|---|---|---|---|
| | Example No.2 | 0.010 0.015 | 937 862 | 924 | cohesive cohesive |
| | no siloxane | 0.008 | 996 | | partial cohesive |
| | | 0.010 | 900 | | partial cohesive |
| Example No. 5 no siloxane | Example No. 1 w/siloxane | 0.010 0.010 | 711 588 | 650 | adhesive adhesive |
| | Example No. 2 | 0.005 0.010 | 415 642 | 447 | adhesive adhesive |
| | no siloxane | 0.010 | 285 | | adhesive |
| Example No. 4 w/siloxane | Example No. 1 w/siloxane | 0.005 0.010 0.008 | 1244 1203 1265 | 1237 | cohesive cohesive cohesive |
| | Example No. 2 | 0.008 0.010 | 1120 1063 | 1091 | cohesive cohesive |
| | no siloxane | 0.010 | 1091 | | cohesive |
| Example No. 6 no siloxane | Example No. 1 | 0.010 | 937 | 926 | cohesive/ adhesive |
| | w/siloxane | 0.010 | 891 | | cohesive/ adhesive |
| | | 0.012 | 950 | | cohesive/ adhesive |
| | Example No. 2 | 0.005 | 723 | 776 | cohesive/ adhesive |
| | no siloxane | 0.010 | 795 | | cohesive/ adhesive |
| | | 0.008 | 810 | | cohesive/ adhesive |

The test results illustrate that the highest lap shear strength that was achieved when using the siloxane-modified phenolic resin-containing adherend of Example No. 3 occurred when it was combined with the siloxane-modified epoxy adhesive of Example No. 1, i.e., an adhesive/adherend system where both the adhesive and adherend contained siloxane modification. Similarly, the highest lap shear strength for the siloxane-modified epoxy resin-containing adherend of Example No. 4 occurred when it was combined with the siloxane-modified epoxy adhesive of Example No. 1. Each of these test groups, where the siloxane-modified adhesive and adherend were bonded together, displayed lap shear strength test values that were higher than test values measured for the test groups where the adhesive component and/or the adherend component were lacking polysiloxane modification. The results of this test clearly demonstrate the superior bond strength provided by adhesive/adherend systems of this invention.

Additional Examples

Siloxane-modified adhesive and adherend systems of this invention are well suited for use as structural adhesive-high performance composite systems, e.g., fiberglass-reinforced epoxy and phenolic piping systems. The following are examples of fiberglass-reinforced pipe/adhesive systems prepared according to principles of this invention. A fiberglass-reinforced pipe and pipe fittings were constructed using the siloxane-modified phenolic resin formula set forth above in Example No. 3, via a standard reciprocal filament-winding process. A fiberglass-reinforced pipe and pipe fittings were also constructed using the unmodified phenolic resin formula set forth above in Example No. 5, via the same reciprocal filament-winding process. The siloxane-modified and unmodified pipes were cut into two-foot sections and joined together with a respective siloxane-modified or unmodified pipe fitting, using both siloxane-modified epoxy resin adhesives, and unmodified epoxy resin adhesives, to form a pipe joint assembly.

The siloxane-modified epoxy resin adhesives that were used to join the pipe sections together were identical or similar to those adhesive compositions disclosed above in Example Nos. 1 and 2. Referring to Table 2 below, adhesives A through C are unmodified epoxy resin adhesives and, more specifically, adhesive "A" is identical to that of Example No. 2, and adhesives "B" and "C" are similar to that of example No. 2. Adhesives D through G were siloxane-modified epoxy adhesives prepared according to principles of this invention and, more specifically, adhesives D through G are similar to that of Example No. 1.

The pipe joint assemblies were subjected to ASTM D1599 short term burst (STB) testing to establish the short time hydraulic failure pressure of thermosetting resin piping systems, which is an indication of the strength of the bond between the pipe, adhesive and fitting. The short term burst test results are shown in Table 2 and demonstrate that pipe fitting assemblies comprising both an adherend formed from a siloxane-modified phenolic resin (i.e., having siloxane modification) and an adhesive formed from a siloxane-modified epoxy resin (i.e., having siloxane modification) generally provide greater STB values than pipe fitting assemblies comprising only a single component having siloxane modification.

The pipe joint assemblies were also subjected to a 20 minute fire test. As the results in Table 2 indicate, pipe fitting assemblies comprising both the siloxane-modified epoxy adhesive component and the siloxane-modified phenolic adherend component did not ignite and burn, and there was not joint leakage detected. This is further evidence of the exceptional adhesion provided by the siloxane-modified adhesive/adherend systems of the current invention.

TABLE 2

PHENOLIC PIPE ADHESIVE TEST DATA

| ADHESIVE SYSTEM | STB WITH UNMODIFIED PHENOLIC PIPE JOINTS (psi) | 20 MINUTE PROPANE FIRE TEST | STB WITH Si—O MODIFIED PHENOLIC PIPE JOINTS (psi) | 20 MINUTE PROPANE FIRE TEST |
|---|---|---|---|---|
| A | 1500 | ignites and burns | 1650 | ignites and burns |
| B | 1150 | ignites and burns | 1400 | ignites and burns |
| C | 1630 | — | 2095 | — |
| D | 2150 | does not ignite no joint leakage | 2400 | does not ignite |
| E | 2075 | — | 2200 | — |
| F | 1860 | — | 1950 | — |
| G | 1400 | — | 1650 | — |

Although siloxane-modified adhesive-adherend systems of the present invention have been described with considerable detail with reference to certain preferred variations thereof, other variations are possible. Therefore, the spirit and scope of the appended claims should not be limited to the preferred variations described herein.

What is claimed is:

1. An adhesive/adherend system comprising:
   an adhesive component comprising siloxane groups distributed therein wherein the adhesive component is prepared by combining:
   an epoxy resin; with
   an organosilane ingredient;
   a polysiloxane resin;
   an amine hardener;
   an organometallic catalyst; and
   a base catalyst; and
   an adherend component fabricated from a material comprising siloxane groups distributed therein, wherein the adhesive component is in contact with the adherend component.

2. The adhesive/adherend system as recited in claim 1 wherein the epoxy resin is selected from the group consisting of aliphatic, cycloaliphatic and aromatic epoxy resins having greater than one epoxide group per molecule.

3. The adhesive/adherend system as recited in claim 1 wherein the organosilane ingredient has a weight average molecular weight of from about 90 to 500, and is selected from the group consisting of epoxy silanes, aminosilanes, mercaptosilanes, vinyl silanes, acryl, and methacrylic silanes having the following general formula:

where "Y" is an organo-functional group selected from where $R_3$ is selected from the group consisting of alkyl, cycloalkyl, alkylaryl, alkenyl, aryl aminoalkyl, aminoaryl, and aminocycloalkyl groups having up to about ten carbon atoms, and where each $R_4$ group is independently selected from the group consisting of alkyl, cycloalkyl, aryl, alkoxy, and acetoxy groups.

4. The adhesive/adherend system as recited in claim 1 wherein the polysiloxane resin is selected from the group consisting of silanol- and alkoxy-functional polysiloxane resins having the general formula:

where each $R_2$ is independently selected from the group consisting of the hydroxy group and alkyl, aryl, alkenyl, and alkoxy groups having up to about six carbon atoms, where each $R_1$ is independently selected from the group consisting of hydrogen, alkyl, alkenyl, and aryl groups having up to about 12 carbon atoms, and where "n" is selected so that the polysiloxane resin ingredient has a weight average molecular weight of from about 200 to 10,000.

5. The adhesive/adherend system as recited in claim 1 wherein the amine hardener is selected from the group consisting of aliphatic amines, cycloaliphatic amines, aromatic amines, polyamides, and amidoamines having at least two active amine hydrogens per molecule.

6. The adhesive/adherend system as recited in claim 1 wherein the base catalyst is an amine having the general formula where each $R_9$ and $R_{10}$ group is independently selected from the group consisting of hydrogen, aryl, and alkyl groups having up to about 12 carbon atoms, and where $R_{11}$ is selected from the group consisting of alkyl, aryl, and hydroxy alkyl groups having up to about 12 carbon atoms.

7. The adhesive/adherend system as recited in claim 1 wherein the adhesive component further comprises a thickener and an extended pigment.

8. The adhesive/adherend system as recited in claim 1 wherein the adherend component is a composite comprising a reinforcing material and a resin component formed from a polysiloxane resin ingredient.

9. The adhesive/adherend system as recited in claim 8 wherein the resin component of the adherend further comprises a resin selected from the group consisting of epoxy, phenolic, polyester, vinyl ester, polyurethane, polyamide, melamine, furan, acrylate, thermoplastic polyvinyl chloride, polyethylene, polycarbonate, acrylonitrile-butadiene-styrene copolymer, polystyrene, ethylene vinyl acetate, polyvinyl acetate, polyamide, and polypropylene resins.

10. The adhesive/adherend system as recited in claim 1 wherein the adhesive component and adherend component are bonded together by Si—O—Si linkages.

11. An adhesive/adherend system comprising:
    an adhesive composition prepared by combining:
        an epoxy resin; with
        an organosilane ingredient;
        a polysiloxane resin;
        an amine hardener;
        an organometallic catalyst; and
        a base catalyst; and
    an adherend composite fabricated from a siloxane-containing resin that forms Si—O—Si bonds with the polysiloxane resin of the adhesive composition when the adhesive composition and adherend composite are placed into contact to form a strong attachment therewith.

12. The adhesive/adherend system as recited in claim 11 wherein the epoxy resin is selected from the group consisting of aliphatic, cycloaliphatic and aromatic epoxy resins having greater than one epoxide group per molecule.

13. The adhesive/adherend system as recited in claim 12 wherein the organosilane ingredient has a weight average molecular weight of from about 90 to 500, and is selected from the group consisting of epoxy silanes, aminosilanes, mercaptosilanes, vinyl silanes, acryl, and methacrylic silanes having the following general formula:

where "Y" is an organo-functional group selected from where $R_3$ is selected from the group consisting of alkyl, cycloalkyl, alkylaryl, alkenyl, aryl, aminoalkyl, aminoaryl, and aminocycloalkyl groups having up to about ten carbon atoms, and where each $R_4$ group is independently selected from the group consisting of alkyl, cycloalkyl, aryl, alkoxy, and acetoxy groups.

14. The adhesive/adherend system as recited in claim 11 wherein the polysiloxane resin is selected from the group consisting of silanol- and alkoxy-functional polysiloxane resins having the general formula:

where each $R_2$ is independently selected from the group consisting of the hydroxy group and alkyl, aryl, alkenyl, and alkoxy groups having up to about six carbon atoms, where each $R_1$ is independently selected from the group consisting of hydrogen, alkyl, alkenyl, and aryl groups having up to about 12 carbon atoms, and where "n" is selected so that the polysiloxane resin ingredient has a weight average molecular weight of from about 200 to 10,000.

15. The adhesive/adherend system as recited in claim 14 wherein the adhesive component further comprises a fumed silica thickener.

16. The adhesive/adherend system as recited in claim 15 wherein the adhesive component further comprises an extender pigment.

17. The adhesive/adherend system as recited in claim 13 wherein the amine hardener is selected from the group consisting of aliphatic amines, cycloaliphatic amines, aromatic amines, polyamides, and amidoamines having at least two active amine hydrogens per molecule.

18. The adhesive/adherend system as recited in claim 11 wherein the siloxane-containing component of the adherend composite further comprises a resin selected from the group consisting of epoxy, phenolic, polyester, vinyl ester, polyurethane, polyamide, melamine, furan, acrylate, thermoplastic polyvinyl chloride, polyethylene, polycarbonate, acrylonitrile-butadiene-styrene copolymer, polystyrene, ethylene vinyl acetate, polyvinyl acetate, polyamide, and polypropylene resins.

19. The adhesive/adherend system as recited in claim 11 wherein a sufficient amount of the organometallic catalyst and base catalyst is used to prepare the adhesive composition to promote forming Si—O—Si bonds with the siloxane-containing component of the adherend at ambient temperature.

20. An adhesive/adherend system comprising:
    an adhesive composition prepared by combining:
        an epoxy resin; with
        an organosilane ingredient;
        a polysiloxane resin selected from the group consisting of silanol- and alkoxy-functional polysiloxane resins having the general formula:

where each $R_2$ is independently selected from the group consisting of the hydroxy group and alkyl, aryl, alkenyl, and alkoxy groups having up to about six carbon atoms, where each $R_1$ is independently selected from the group consisting of hydrogen, alkyl, alkenyl, and aryl groups having up to about 12 carbon atoms, and where "n" is selected so that the polysiloxane resin ingredient has a weight average molecular weight of from about 200 to 10,000; a thickener;

an amine hardener;

an organometallic catalyst;

a base catalyst; and an extender pigment; and an adherend composite comprising:

a siloxane-containing component that forms Si-O-Si bonds with the polysiloxane resin of the adhesive composition when the adhesive composition and adherend composite are placed into contact to form an attachment therewith; and a resin selected from the group consisting of epoxy, phenolic, polyester, vinyl ester, polyurethane, polyamide, melamine, furan, acrylate, thermoplastic polyvinyl chloride, polyethylene, polycarbonate, acrylonitrile-butadiene-styrene copolymer, polystyrene, ethylene vinyl acetate, polyvinyl acetate, polyamide, and polypropylene resins.

21. The adhesive/adherend system as recited in claim 20 wherein the epoxy resin used to form the adhesive component is selected from the group consisting of aliphatic, cycloaliphatic and aromatic epoxy resins having greater than one epoxide group per molecule.

22. The adhesive/adherend system as recited in claim 21 wherein from about 15 to 40 percent by weight of the epoxy resin is used based on the total adhesive composition.

23. The adhesive/adherend system as recited in claim 20 wherein the organosilane ingredient has a weight average molecular weight of from about 90 to 500, and is selected from the group consisting of epoxy silanes, aminosilanes, mercaptosilanes, vinyl silanes, acryl, and methacrylic silanes having the following general formula:

where "Y" is an organo-functional group selected from where $R_3$ is selected from the group consisting of alkyl, cycloalkyl, alkylaryl, alkenyl, aryl, aminoalkyl, aminoaryl, and aminocycloalkyl groups having up to about ten carbon atoms, and where each $R_4$ group is independently selected from the group consisting of alkyl, cycloalkyl, aryl, alkoxy, and acetoxy groups.

24. The adhesive/adherend system as recited in claim 20 wherein the amine hardener is selected from the group consisting of aliphatic amines, cycloaliphatic amines, aromatic amines, polyamides, and amidoamines having at least two active amine hydrogens per molecule.

25. The adhesive/adherend system as recited in claim 24 wherein from about 1 to 25 percent by weight of the amine hardener is used based on the total adhesive composition.

26. The adhesive/adherend system as recited in claim 20 wherein the base catalyst is selected from the group of amine compounds having the general formula:

where each $R_9$ and $R_{10}$ group is independently selected from the group consisting of hydrogen, aryl, and alkyl groups having up to about 12 carbon atoms, and where $R_{11}$ is selected from the group consisting of alkyl, aryl, and hydroxy alkyl groups having up to about 12 carbon atoms.

27. The adhesive/adherend system as recited in claim 20 wherein the siloxane-containing component of the adherend is formed from the polysiloxane resin.

28. The adhesive/adherend system as recited in claim 27 wherein the siloxane-containing component of the adherend further comprises a resin selected from the group consisting of epoxy, phenolic, polyester, vinyl ester, polyurethane, polyamide, melamine, furan, acrylate, thermoplastic polyvinyl chloride, polyethylene, polycarbonate, acrylonitrile-butadiene-styrene copolymer, polystyrene, ethylene vinyl acetate, polyvinyl acetate, polyamide, and polypropylene resins.

29. An adhesive/adherend system comprising:

an adhesive composition prepared by combining:
an epoxy resin; with
an organosilane ingredient;
a polysiloxane resin;
a fumed silica thickener;
an amine hardener;
an organometallic catalyst;
an amine curative agent; and
an extender pigment; and an adherend composite fabricated from a reinforcing material and a siloxane-containing component disposed throughout the composite that forms Si—O—Si bonds with siloxane groups of the adhesive composition when the adhesive composition and adherend composite are placed into contact with one another to form an attachment therewith.

30. The adhesive/adherend system as recited in claim 29 wherein a sufficient amount of the organometallic catalyst and base catalyst is used to prepare the adhesive composition to promote forming Si—O—Si bonds with the siloxane-containing component of the adherend at ambient temperature.

31. The adhesive/adherend system as recited in claim 29 wherein the polysiloxane resin is selected from the group consisting of silanol- and alkoxy-functional polysiloxane resins having the general formula:

where each $R_2$ is independently selected from the group consisting of the hydroxy group and alkyl, aryl, alkenyl, and alkoxy groups having up to about six carbon atoms, where each $R_1$ is independently selected from the group consisting of hydrogen, alkyl, alkenyl, and aryl groups having up to about 12 carbon atoms, and where "n" is selected so that the polysiloxane resin ingredient has a weight average molecular weight of from about 200 to 10,000.

* * * * *